(12) United States Patent
Cross (10) Patent No.: US 11,286,967 B2
(45) Date of Patent: Mar. 29, 2022

(54) BI-DIRECTIONAL CLAMP

(71) Applicant: WOODPECKERS, LLC, Strongvillle, OH (US)

(72) Inventor: Steven Cross, Strongsville, OH (US)

(73) Assignee: Woodpeckers, LLC, Strongsville, OH (US)

(*) Notice: Subject to any disclaimer, the term of this patent is extended or adjusted under 35 U.S.C. 154(b) by 307 days.

(21) Appl. No.: 16/597,519

(22) Filed: Oct. 9, 2019

(65) Prior Publication Data
US 2021/0108661 A1    Apr. 15, 2021

(51) Int. Cl.
| | |
|---|---|
| *F16B 2/10* | (2006.01) |
| *B23Q 3/00* | (2006.01) |
| *B23Q 3/06* | (2006.01) |
| *F16B 2/12* | (2006.01) |

(52) U.S. Cl.
CPC ............... *F16B 2/10* (2013.01); *B23Q 3/005* (2013.01); *B23Q 3/06* (2013.01); *F16B 2/12* (2013.01); *B23Q 2703/02* (2013.01)

(58) Field of Classification Search
CPC ..... B25B 1/2473; B25B 1/2478; B25B 5/003; B25B 5/103; B25B 5/12; B25B 5/127; B25B 5/14; B25B 5/166; B25B 5/145
See application file for complete search history.

(56) References Cited

U.S. PATENT DOCUMENTS 3,964,738 A * 6/1976 Owen ........................ B25B 5/06
                                                          269/221
4,671,500 A * 6/1987 Mark ........................ B25B 1/12
                                                          269/134

OTHER PUBLICATIONS

CompressX. http://www.compressx.com.au/index.php (Year: 2008).*
DNJ Innovations Pty Ltd , CompressX, Website, 2007, Australia.

* cited by examiner

*Primary Examiner* — Tyrone V Hall, Jr.
(74) *Attorney, Agent, or Firm* — Sand, Sebolt & Wernow Co., LPA (57) ABSTRACT

The present disclosure relates generally to a bi-directional clamp system and method of use. More particularly, a bi-directional clamp with two clamp bars and two clamping assemblies are described herein. The clamp assemblies have a plurality of arms freely movable in response to a material load is described herein.

22 Claims, 8 Drawing Sheets

BI-DIRECTIONAL CLAMP

TECHNICAL FIELD

The present disclosure relates generally to a bi-directional clamp system and method of use. More particularly, the present disclosure relates bi directional clamp with two clamp bars and a plurality of clamp arms. Specifically, the present disclosure a bi-directional clamp that applies force in four directions to material that readily deforms to the material placed within the clamp system.

BACKGROUND

Background Information

Clamps are an indispensable piece of equipment for a worker who desires to work independently. They enable users to securely grip multiple work pieces while performing various tasks on the work pieces. These tasks include but are not limited to sanding, finishing, cutting, and gluing. Clamps are generally indispensable for projects that require glue. When using glue, the work pieces may need to be held in operative contact for an extended time period in order to allow for the glue to adequately cure and dry in order to keep the work pieces in operative contact once the clamps are removed.

Common clamps are bench vise style clamps, bar clamps, and C-clamps that may be affixed to a work surface such as a table or work bench. In the case of bench vise style clamps they often include a first jaw and a second jaw which are positioned on a bar. A user may rotate, trigger, or otherwise advances the bar in a first direction through an opening of a first bar to bring the first jaw adjacent to the second jar to securely grip work pieces together. When work is complete, the bar may then be retreated in a second direction so that the work piece may be removed.

When dealing with clamps it is of high importance that the clamp exerts constant linear force so as to not warp, bow, or otherwise upset the task at hand. If the clamp is not successful in doing so, there may be hours of progress on a work piece lost to destruction of the work due to ineffective or improper clamping.

SUMMARY

In one aspect, an exemplary embodiment of the present disclosure may provide a system for clamping material, said system comprising: a first clamp bar extending in a transverse manner, a second clamp bar parallel to the first clamp bar extending in a transverse manner, a first clamp assembly operatively coupled to the first clamp bar and the second clamp bar, a second clamp assembly operatively coupled to the first clamp bar and the second clamp bar; wherein each the first clamp bar and second clamp bar have a plurality of clamp arms; and wherein the system is operative to apply force to four sides of a material desired to be clamped. This exemplary embodiment or another may provide the plurality of clamp arms are angled at an angle greater than 90 degrees and less than 150 degrees. This exemplary embodiment or another may provide the plurality of clamp arms are angled at an angle greater than 90 degrees and less than 120 degrees. This exemplary embodiment or another may provide the first clamp assembly comprises: a first clamp arm, a second clamp arm, a third clamp arm, a fourth clamp arm, a clamping foot, a handle, and a threaded member, operatively connected to the handle at a first end and the clamping foot at a second end, wherein rotation of the handle in a first direction is operative to move the threaded member and thereby the clamping foot in a direction towards the material. This exemplary embodiment or another may provide the clamping foot is of an H-shape. This exemplary embodiment or another may provide the second clamp assembly is operative to be disengaged from the first and second rail. This exemplary embodiment or another may provide the first clamp bar and second clamp bar contain a plurality of apertures. This exemplary embodiment or another may provide the first clamp assembly is attached by a first engagement placed through an aperture in the first and third clamp arms to the first clamp bar and a second engagement placed through an aperture in the second and fourth clamp arms to the second rail bar. This exemplary embodiment or another may provide the second clamp assembly comprises: a fifth clamp arm, a sixth clamp arm, a seventh clamp arm, a clamping foot; and a post. This exemplary embodiment or another may provide the second clamp assembly is attached by a first removable engagement placed through an aperture in the fifth and seventh clamp arms to the first clamp bar and a second removable engagement placed through an aperture in the sixth and eighth clamp arms to the second rail bar. This exemplary embodiment or another may provide the clamping foot of the first clamp assembly and the clamping foot of the second clamp assembly is removable and operative to be replaced with a further clamping foot on the first clamp assembly and a further foot on the second clamp assembly of a different length from the original clamping foot of the first clamp assembly and the clamping foot from the second clamp assembly. This exemplary embodiment or another may provide the first clamp bar and second clamp bar may be interchanged with a third clamp bar and a fourth clamp bar that are of different length than the first clamp bar and second clamp bar. This exemplary embodiment or another may provide the first clamp bar assembly and second clamp bar assembly are operative to freely deform about the plurality of clamp arms.

In another aspect, an exemplary embodiment of the present disclosure may provide a method for clamping work material comprising: loading work material into a first clamp bar with a bottom surface and a second clamp bar with a top surface, contacting the work material with the bottom of the first clamp bar and the top surface of the second clamp bar, abutting the work material with a clamping foot on a first clamp assembly, further abutting the work material with a clamping foot on a second clamp assembly, and applying force to four sides of the work material by the bottom surface of the first clamp bar, top surface of the second clamp bar, the clamping foot on the first clamp assembly and the clamping foot on the second clamp assembly. This exemplary embodiment or another may provide further abutting further comprises: attaching the second clamp assembly to first and second clamp bar. This exemplary embodiment or another may provide prior to loading: removing the second clamp assembly. This exemplary embodiment or another may provide the abutting further comprises: rotating a handle in engagement with the clamping foot to bring the clamping foot in engagement with the material. This exemplary embodiment or another may provide further abutting further comprises: attaching the second clamp assembly at an aperture of the first clamp bar via a removable pin, and further attaching the second clamp assembly at an aperture of the second clamp bar via a removable pin. This exemplary embodiment or another may provide loading further comprises: placing a piece of further material above or below the work material to abut at least one of the first clamp bar or second clamp bar if the material has a thickness of less than ⅜ of an inch. This exemplary embodiment or another may provide loading further comprises: placing a piece of further material to a side of the work material to abut at least one of the clamping foot on the first clamp assembly or second clamp assembly.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

A new system 10 and method of operation thereof is depicted in the present disclosure and throughout FIGS. 1-10. System 10 is a new and improved apparatus for clamping boards together, as will be discussed hereafter.

Figure 1:
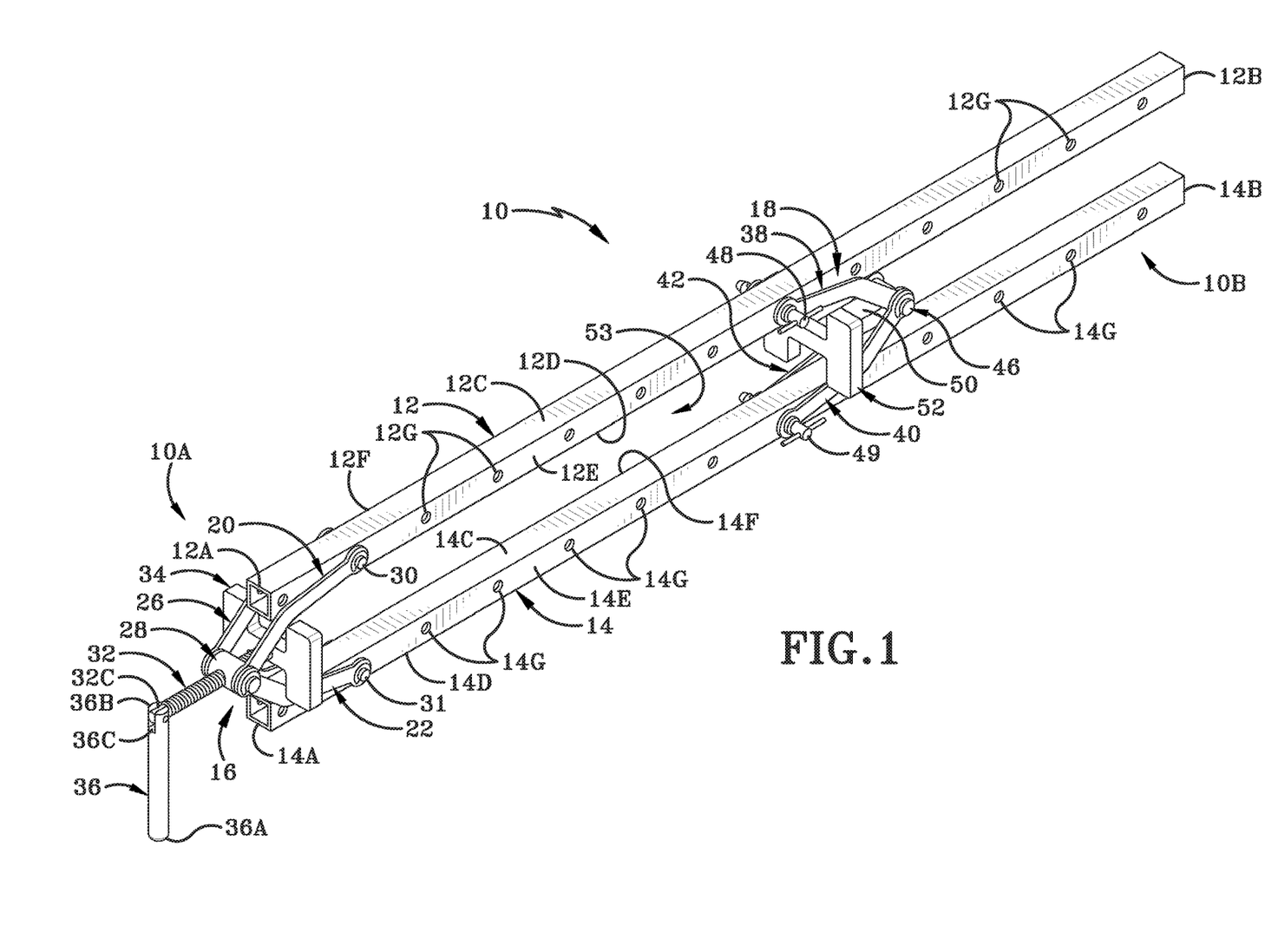
FIG. 1 is a front left side perspective view of an exemplary clamp system.

Referring now to FIG. 1, a clamp system 10 is shown. The clamp system 10 includes a first side 10A, and a second side 10B with clamp bars 12, 14 as well as a first, or threaded, clamp assembly 16 and a second, or further, clamp assembly 18. The first clamp bar 12 has a generally hollow body which includes a first end 12A, a second end 12B transversely opposed to the first end 12A, a top side 12C, a bottom side 12D vertically disposed from the top side 12C, a first side 12E and a second side 12F longitudinally opposed to the first side 12E. The clamp bar 12 further includes a plurality of equally spaced through holes 12G located on the first side 12E and second side 12F. The through holes 12G are generally circular in nature and are at the same height within the sides 12E, 12F.

The second clamp bar 14 has a generally hollow body which includes a first end 14A, a second end 14B transversely opposed to the first end 14A, a top side 14C, a bottom side 14D vertically disposed from the top side 14C, a first side 14E and a second side 14F longitudinally opposed to the first side 14E. The clamp bar 14 further includes a plurality of through holes 14G located on the first side 14E and second side 14F. The through holes 14G are generally circular in nature and are at the same height within each of the sides 14E, 14F. In an exemplary embodiment, the clamp bars 12, 14 are approximately 38 inches in length. In a further exemplary embodiment the clamp bars 12, 14 are approximately 50 inches in length. Those skilled in the art will understand the length of the clamp bar can vary to handle the width and length of the desired work piece. Further, in an exemplary embodiment the through holes are spaced apart equal distances.

Referring now to FIG. 2, FIG. 3, FIG. 4, FIG. 5, and FIG. 7, various views focusing on the exemplary first, or threaded, clamp 16 are shown located proximate the first end 10A. The first clamp assembly 16 has a body which includes a first clamp arm 20, a second clamp arm 22, a third clamp arm 24, a fourth clamp arm 26, a pivot bushing 28, a pair of clip pins 30, 31, a threaded member 32, a clamping foot 34, and a handle 36. The first clamp arm 20 has a first end 20A and a second end 20B with a first arm 20F and a second arm 20G transversely opposed thereto. The first end 20A and the second end 20B are at an angle α to one another and are not within the same horizontal plane. The angle α changes at a critical point 20C of the first clamp arm 20. In an exemplary embodiment, the angle α between the first end 20A at the first arm 20F and the second end 20B at the second arm 20G is greater than 90 degrees and less than 180 degrees. In a further embodiment the angle α greater than 110 degrees and less than 160 degrees. In yet another further embodiment the angle α is about 150 degrees. Additionally, further arms discussed later have a first arm and a second arm with a further angle α but are not repeated for the purpose of brevity. The angle α does not change from arm to arm.

Figure 2:
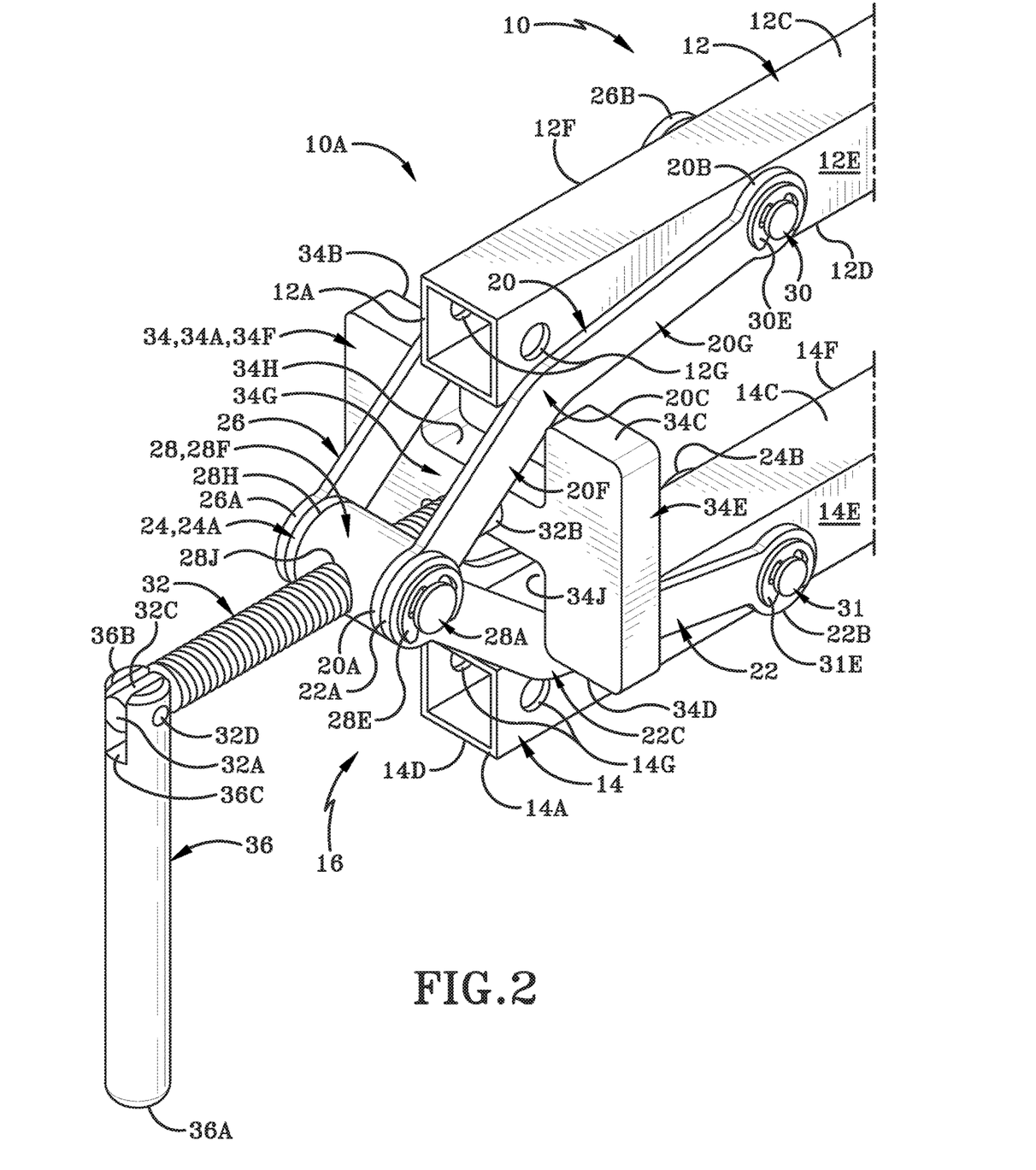
FIG. 2 is a front left side sectional enlarged perspective view of an exemplary threaded clamp.
Figure 3:
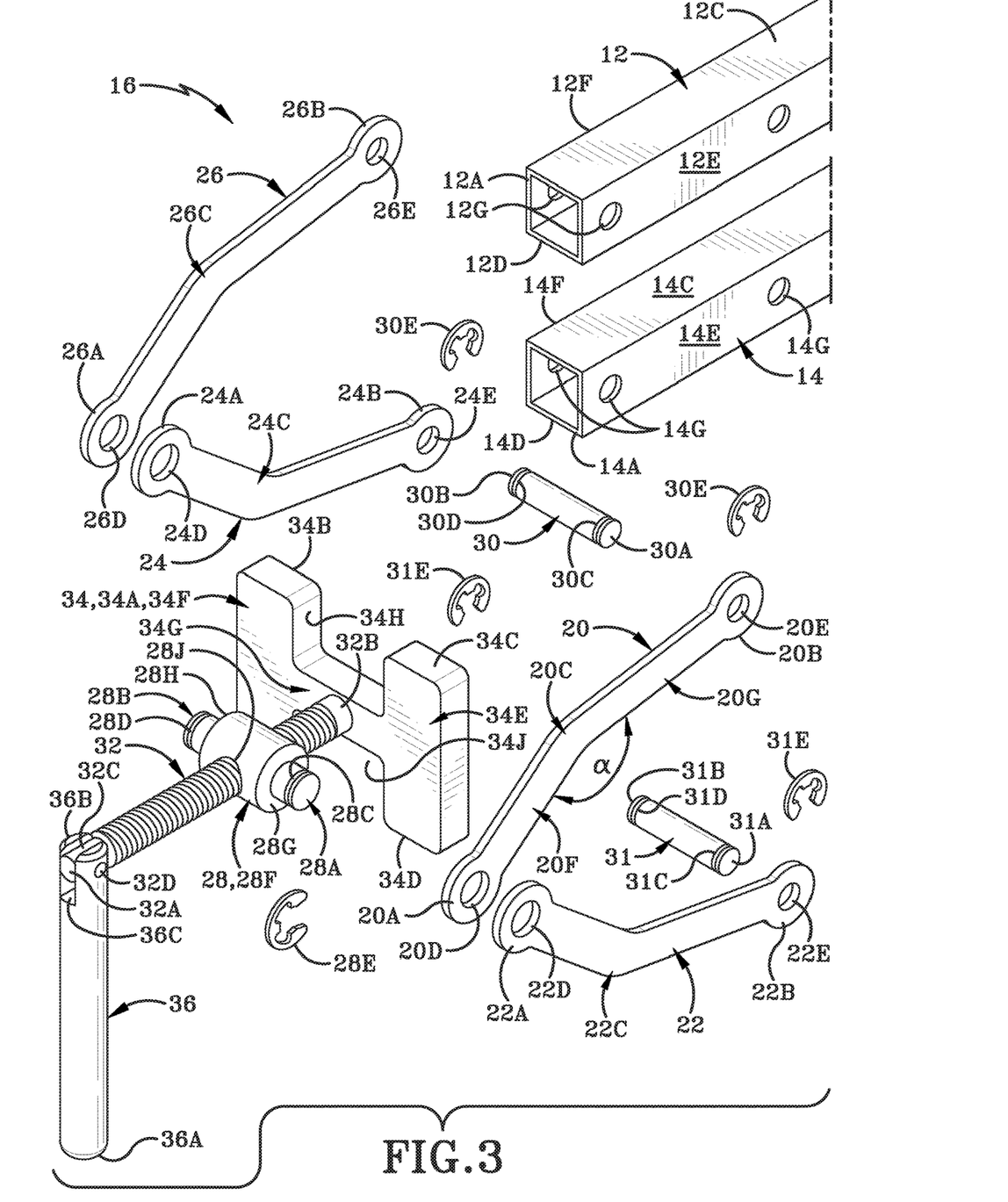
FIG. 3 is a front left side enlarged exploded view of the threaded clamp and a bare rail.

Proximate the first end 20A of the first clamp arm 20, there is a first aperture 20D. The first aperture 20D is circular in shape and is of a diameter equal to or slightly greater than a first end 28A of the pivot bushing 28. Further, the pivot bushing 28 has a body that is generally cylindrical in shape and further has a second end 28B longitudinally disposed from the first end 28A. The pivot bushing 28 further includes a first channel 28C proximate the first end 28A and a second channel 28D proximate the second end 28B. The channels 28C, 28D are cylindrical in nature and have a diameter less than the diameter of the pivot bushing 28 as a whole. The channels 28C, 28D are operative to accept a locking washer 28E within them. There is additionally a larger diameter portion 28F with a first face 28G and a second face 28H. The larger diameter portion 28F has a width of W1, while the clamp bars 12, 14 have a width W2. In this embodiment the width of W1 and W2 are about equal, but in other embodiments they may be different depending on the size of clamp bars and the thickness of various clamp arms.

Further, there is a second aperture 20E proximate the second end 20B of the first clamp arm 20. The second aperture 20E is circular in shape and is of a diameter equal to or slightly greater than the through holes 12G, 14G of the clamp arms 12, 14. The clip pin 30 is operative to nest in the second aperture 20E at a first end 30A. The clip pin 30 has a body and has the first end 30A and a second end 30B longitudinally opposed from the first end 30A. The body of the clip pin 30 is generally cylindrical in nature. The clip pin 30 further includes a first channel 30C proximate the first end 30A and a second channel 30D proximate the second end 30B. The channels 30C, 30D are cylindrical in nature and have a diameter less than the diameter of the clip pin 30 as a whole. The channels 30C, 30D are operative to accept a locking washer 30E within them.

The second clamp arm 22 has a first end 22A and a second end 22B transversely opposed thereto. The first end 22A and the second end 22B are at an angle to one another and are not within the same horizontal plane. The angle changes at a critical point 22C of the second clamp arm 22. In an exemplary embodiment, the angle between the first end 22A and the second end 22B is greater than 90 degrees and less than 180 degrees. In a further embodiment the angle greater than 110 degrees and less than 160 degrees. In yet another further embodiment the angle is about 150 degrees.

Proximate the first end 22A of the second clamp arm 22, there is a first aperture 22D. The first aperture 22D is circular in shape and is of a diameter equal to or slightly greater than the first end 28A of the pivot bushing 28. Further, there is a second aperture 22E proximate the second end 22B of the second clamp arm 22. The second aperture 22E is circular in shape and is of a diameter equal to or slightly greater than the through holes 12G, 14G of the clamp arms 12, 14. The first end 31A of the clip pin 31 is operative to nest in the second aperture 22E. The clip pin 31 has a body and has the first end 31A and a second end 31B longitudinally opposed from the first end 31A. The body of the clip pin 31 is generally cylindrical in nature. The clip pin 31 further includes a first channel 31C proximate the first end 31A and a second channel 31D proximate the second end 31B. The channels 31C, 31D are cylindrical in nature and have a diameter less than the diameter of the clip pin 31 as a whole. The channels 31C, 31D are operative to accept a locking washer 31E within them.

The third clamp arm 24 has a first end 24A and a second end 24B transversely opposed thereto. The first end 24A and the second end 24B are at an angle to one another and are not within the same vertical plane. The angle changes at a critical point 24C of the third clamp arm 24. In an exemplary embodiment, the angle between the first end 24A and the second end 24B is greater than 90 degrees and less than 150 degrees. In a further embodiment the angle greater than 90 degrees and less than 135 degrees. In yet another further embodiment the angle is greater than 90 degrees and less than 120 degrees.

Proximate the first end 24A of the third clamp arm 24, there is a first aperture 24D. The first aperture 24D is circular in shape and is of a diameter equal to or slightly greater than the second end 28B of the pivot bushing 28. Further, there is a second aperture 24E proximate the second end 24B of the third clamp arm 24. The second aperture 24E is circular in shape and is of a diameter equal to or slightly greater than the through holes 12G, 14G of the clamp arms 12, 14. The second end 30A of the clip pin 30 is operative to nest in the second aperture 24E.

The fourth clamp arm 26 has a first end 26A and a second end 26B transversely opposed thereto. The first end 26A and the second end 26B are at an angle to one another and are not within the same vertical plane. The angle changes at a critical point 26C of the fourth arm 26. In an exemplary embodiment, the angle between the first end 26A and the second end 26B is greater than 90 degrees and less than 150 degrees. In a further embodiment the angle greater than 90 degrees and less than 135 degrees. In yet another further embodiment the angle is greater than 90 degrees and less than 120 degrees.

Proximate the first end 26A of the fourth clamp arm 26, there is a first aperture 26D. The first aperture 26D is circular in shape and is of a diameter equal to or slightly greater than the second end 28B of the pivot bushing 28. Further, there is a second aperture 26E proximate the second end 26B of the fourth clamp arm 26. The second aperture 26E is circular in shape and is of a diameter equal to or slightly greater than the through holes 12G, 14G of the clamp arms 12, 14. The second end 31A of the clip pin 31 is operative to nest in the second aperture 26E.

The first end 20A of the first clamp arm 20 is aligned by its aperture 20D with the first end 28A of the pivot bushing 28 and the first end 28A is placed through the aperture 20D. The first end 30A of the clip pin 30 is placed within the aperture 14G of the second clamp bar 14. The second end 20B of the first clamp arm 20 is aligned by its aperture 20E with the first end 30A of the clip pin 30 and the first end 30A is placed into the aperture 20E. The locking washer 30E is then attached to the clip pin 30 at its channel 30C thereby restricting movement and holding in operative contact the second clamp bar 14 with the second end 20B of the first clamp arm 20.

The first end 22A of the second clamp arm 22 is aligned by its aperture 22D with the first end 28A of the pivot bushing 28 and the first end 28A is placed through the aperture 22D. The locking washer 28E is then attached to the channel 28C of the pivot bushing 28 thereby restricting movement and holding in operative contact the first end 20A of the first clamp arm 20 and the first end 22A of the second clamp arm 22 in operative connection with the pivot bushing 28. The first end 31A of the clip pin 31 is placed within the aperture 12G of the first clamp bar 12. The second end 22B of the second clamp arm 22 is aligned by its aperture 22E with the first end 31A of the clip pin 31 and the first end 31A is placed into the aperture 22E. The locking washer 31E is then attached to the clip pin 31 at its channel 31C, thereby holding in operative contact the first clamp bar 12 with the second end 22B of the second clamp arm 22.

The first end 24A of the third clamp arm 24 is aligned by its aperture 24D with the first end 28A of the pivot bushing 28 and the first end 28A is placed through the aperture 24D. The clip pin 31 having already been placed within the aperture 14G of the second clamp bar 14 is aligned with the second end 24B of the third clamp arm 24 by its aperture 24E. The second end 31B of the clip pin 31 is placed into the aperture 24E. The locking washer 31E is then attached to the clip pin 31 at its channel 31D thereby restricting movement and holding in operative contact the second clamp bar 14 with the second end 24B of the third clamp arm 24.

The first end 26A of the fourth clamp arm 26 is aligned by its aperture 26D with the second end 28B of the pivot bushing 28 and the first end 28B is placed through the aperture 26D. The locking washer 28E is then attached to the channel 28D of the pivot bushing 28 thereby restricting movement and holding in operative contact the first end 24A of the third clamp arm 24 and the first end 26A of the fourth clamp arm 26 in operative connection with the pivot bushing 28. In one embodiment, the locking washer 28E may be a snap ring. The clip pin 30 having already been placed within the aperture 12G of the first clamp bar 12 is aligned with the second end 26B of the fourth clamp arm 26 by its aperture 26E. The second end 26B of the fourth clamp arm 26 is aligned by its aperture 26E with the second end 30B of the clip pin 30 and the second end 30B is placed into the aperture 26E. The locking washer 30E is then attached to the clip pin 30 at its channel 30D, thereby holding in operative contact the first clamp bar 12 with the second end 26B of the fourth clamp arm 26.

The pivot bushing 28 further includes a bore 28F that passes through a central portion of the body of the pivot bushing 28. In one embodiment, the bore is threaded and contains a threaded member 32 within it. The threaded member 32 may be an acme screw or other such adjustable mechanism. The threaded member 32 has a generally cylindrical body with a first end 32A, and a second end 32B that is transversely opposed thereto. Proximate the first end 32A, there is a flat portion 32C with an aperture 32D for a rivet or other connection member.

At the second end 32B there is a clamping foot 34. The clamping foot 34 is operatively engaged with the second end 32B. The clamping foot has a body that is generally "H" shaped with a first face 34A and a second face 34B that is transversely opposed thereto. Further is a top side 34C, a bottom side 34D vertically disposed from the top side 34C. Additionally, there is a first side post 34E, a second side face 34F and a midsection 34G that come to form the "H" shape. Further, there is a cavity 34H on top proximate the arm 12 and a cavity 34J proximate the arm 14. Further, there is a width W4 that is the distance of the cavity 34H and a distance W5 which is the total width of the installed clamp arms 22, 24, 26, 28. The width W4 is slightly larger than the width of W5 to allow for a minuscule amount of play and ease of alignment.

At the first end 32A of the threaded member 32 is a handle 36. The handle 36 has a body that is generally cylindrical with a first end 36A and a second end 36B vertically disposed from the first end 36A. The second end 36B of the handle 36 is connected to the threaded member 32 at its first end 32A. This connection is done by means of the aperture 32D with a rivet or other connection member. The handle further includes proximate the second end 36B a cut out region 36C operative to receive the flat portion 32C of the threaded member 32.

Figure 4:
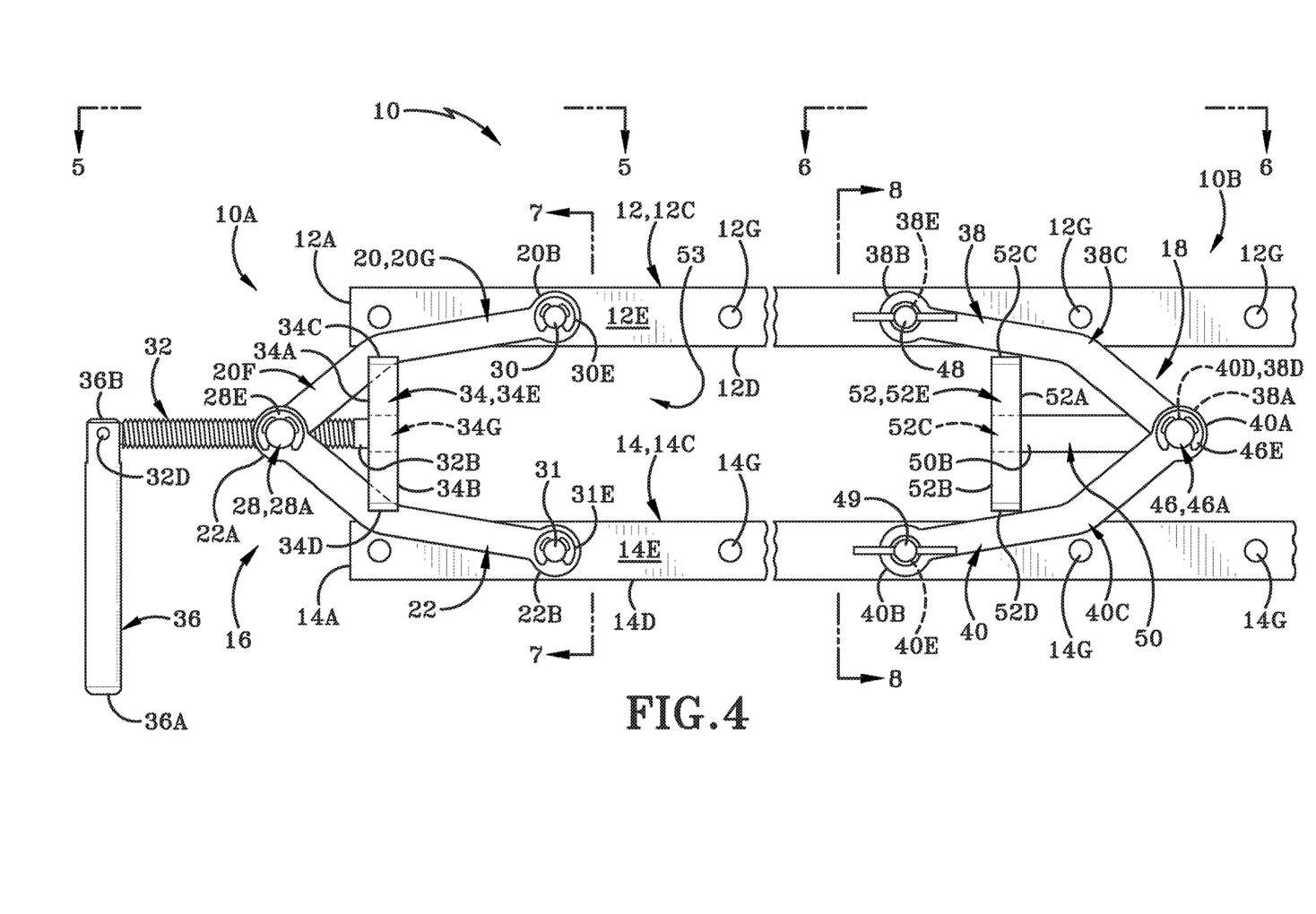
FIG. 4 is a front elevation view of the exemplary clamp system.
Figure 5:
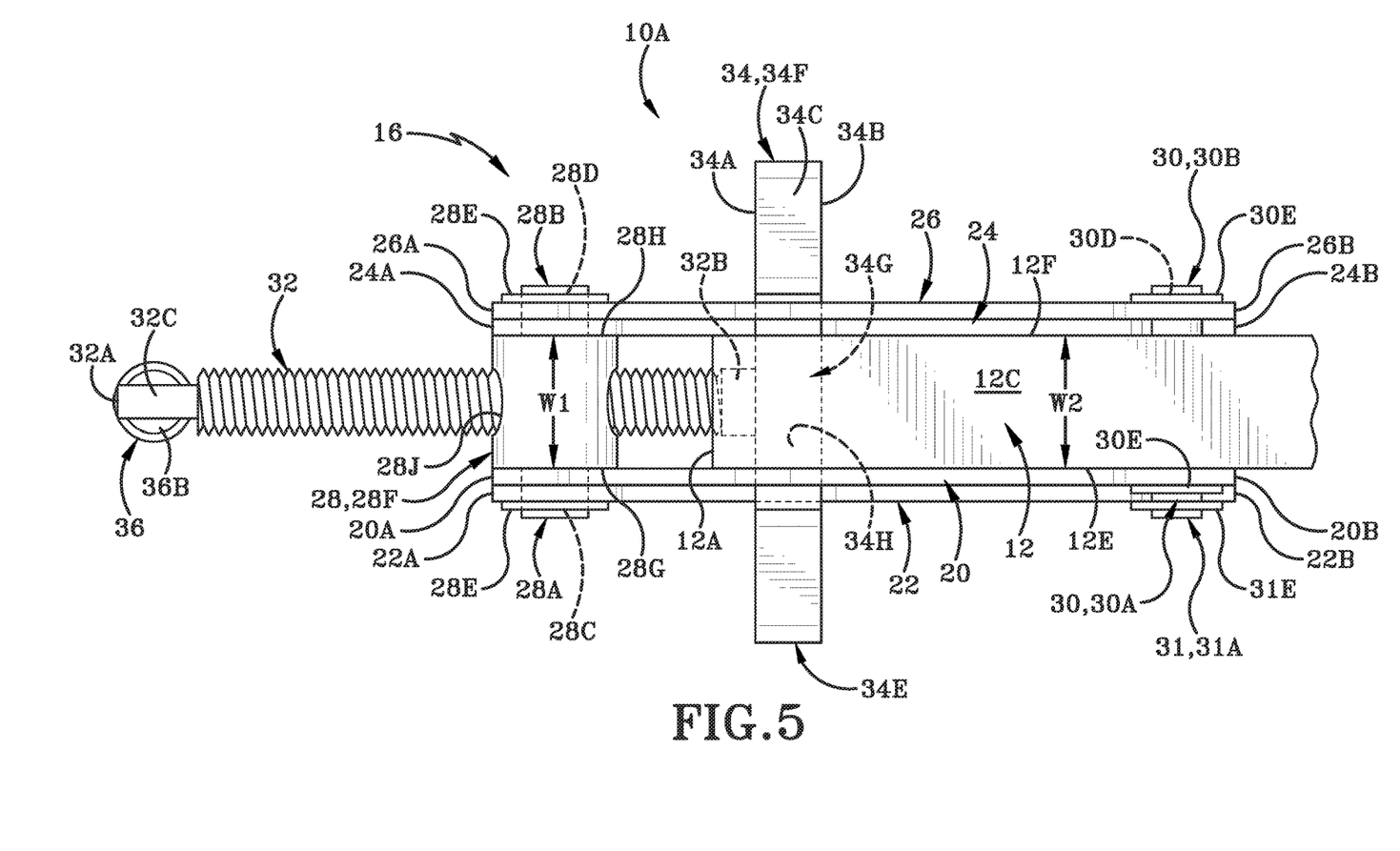
FIG. 5 is a top plan view of the threaded clamp assembly taken along line 5-5 in FIG. 4.
Figure 6:
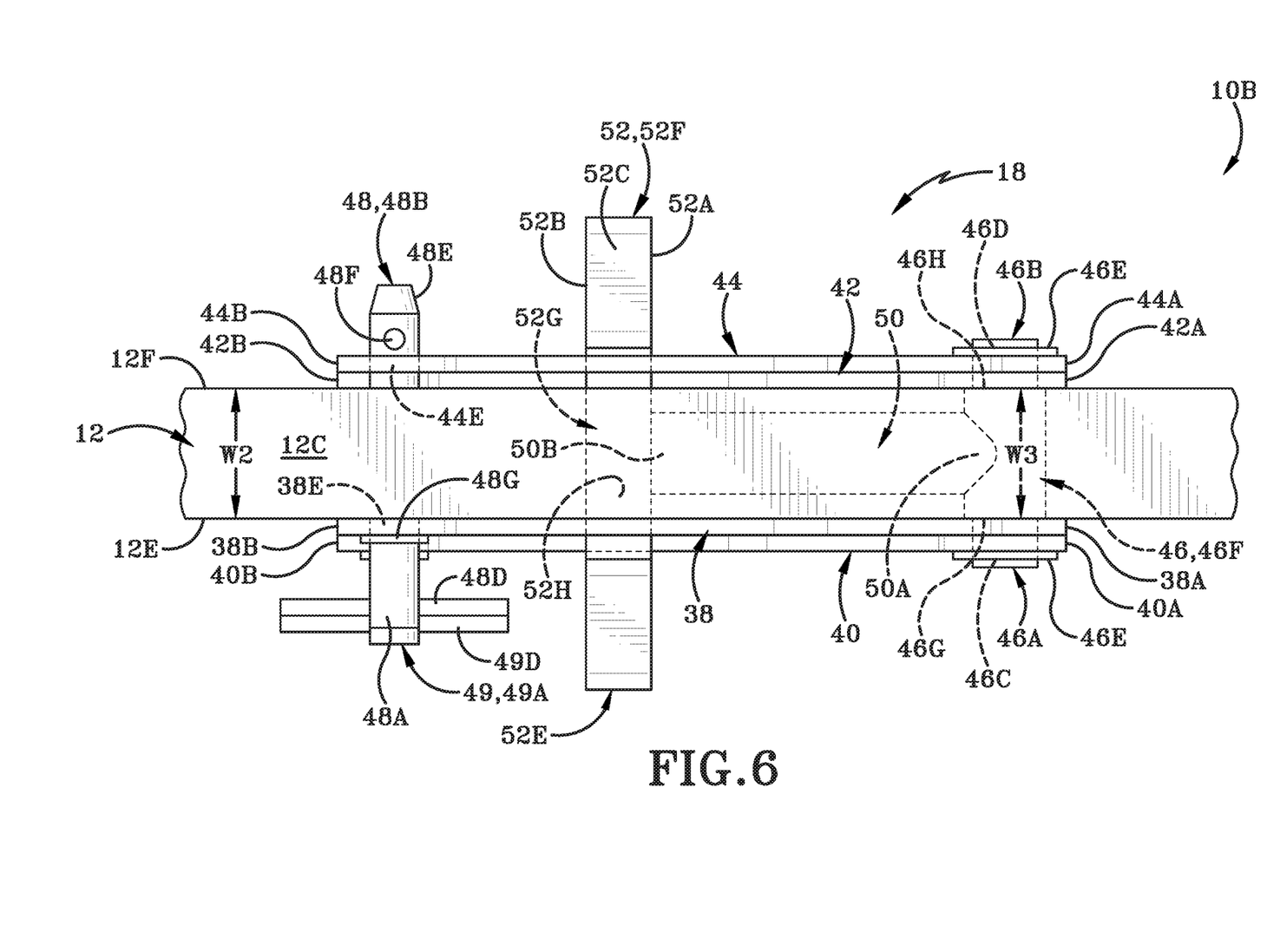
FIG. 6 is a top plan view of a further clamp assembly taken along line 6-6 in FIG. 4
Figure 7:
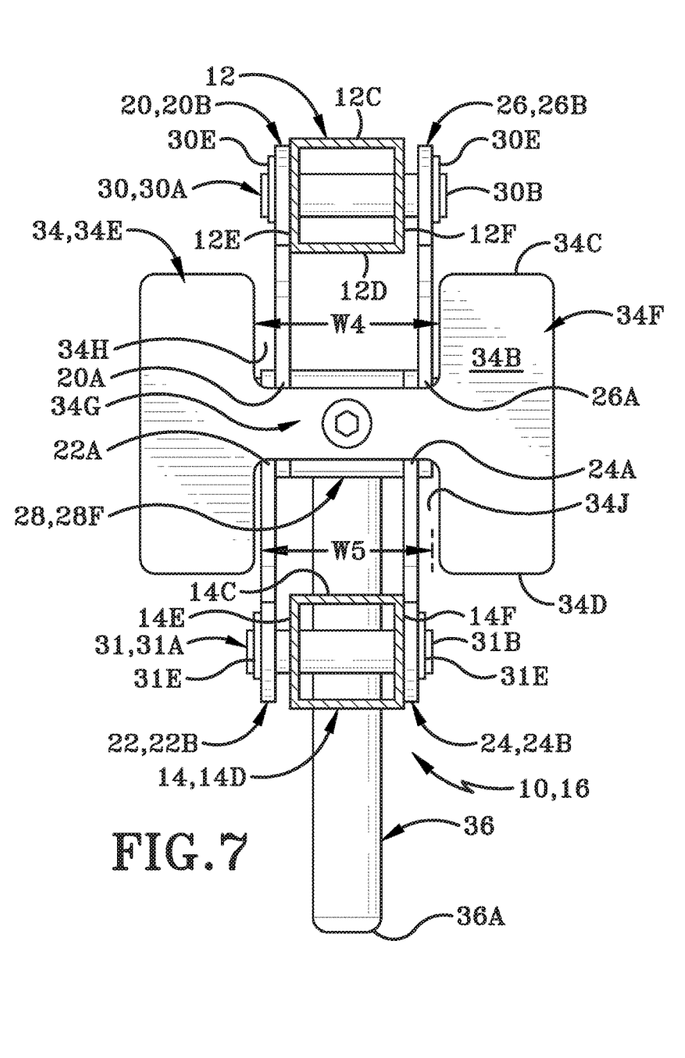
FIG. 7 is a right side elevation view of the threaded clamp assembly taken along line 7-7 in FIG. 4.
Figure 8:
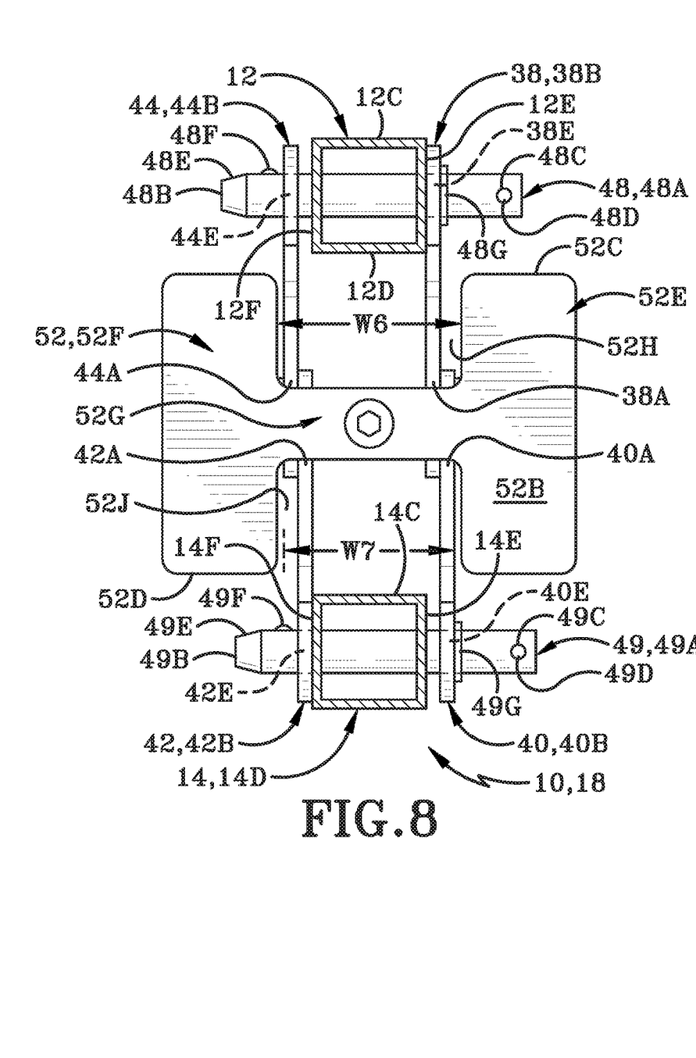
FIG. 8 is a left side elevation view of the further clamp assembly taken along line 8-8 in FIG. 4.

Referring now to FIG. 4, FIG. 6, and FIG. 8, various views focusing on the exemplary second, or further, clamp 18 are shown located at the second end 10B. The sixth clamp assembly 18 has a body which includes, a fifth clamp arm 38, a sixth clamp arm 40, a seventh clamp arm 42 and an eighth clamp arm 44, a pivot bushing 46, a pair of removable lock pins 48, 49, a post 50, and a clamping foot 52. The fifth clamp arm 38 has a first end 38A and a second end 38B transversely opposed thereto. The first end 38A and the second end 38B are at an angle to one another and are not within the same vertical plane. The angle changes at a critical point 38C of the fifth clamp arm 38. In an exemplary embodiment, the angle between the first end 38A and the second end 38B is greater than 90 degrees and less than 150 degrees. In a further embodiment the angle greater than 90 degrees and less than 135 degrees. In yet another further embodiment the angle is greater than 90 degrees and less than 120 degrees.

Proximate the first end 38A of the fifth clamp arm 38, there is a first aperture 38D. The first aperture 38D is circular in shape and is of a diameter equal to or slightly greater than a first end 46A of the pivot bushing 46. Further, the pivot bushing 46 has a body that is generally cylindrical in shape and further has a second end 46B longitudinally disposed from the first end 46A. The pivot bushing 46 further includes a first channel 46C proximate the first end 46A and a second channel 46D proximate the second end 46B. The channels 46C, 46D are cylindrical in nature and have a diameter less than the diameter of the pivot bushing 46 as a whole. The channels 46C, 46D are operative to accept a locking washer 46E within them. There is additionally a larger diameter portion 46F with a first face 46G and a second face 46H. The larger diameter portion 46F has a width of W3, while the clamp bars 12, 14 have a width W2. In this embodiment the width of W3 and W2 are about equal, but in other embodiments they may be different depending on the size of clamp bars and the thickness of various clamp arms.

Further, there is a second aperture 38E proximate the second end 38B of the fifth clamp arm 38. The second aperture 38E is circular in shape and is of a diameter equal to or slightly greater than the through holes 12G, 14G of the clamp arms 12, 14. The removable lock pin 48 is operative to nest in the second aperture 38E at a first end 48A. The removable lock pin 48 has a body and has the first end 48A and a second end 48B longitudinally opposed from the first end 48A. The body of the removable lock pin 48 is generally cylindrical in nature with an aperture 48C with a graspable projection 48D proximate the first end 48A. At the second end 48B there is a tapered portion 48E. Proximate the tapered portion 48E is a bearing 48F. The bearing 48F is operative to restrict movement of the pin 48 while inserted and no force is applied to the pin about its graspable projection 48D. Further, there is a retaining portion 48G operative to restrict movement the clamp arms of the lock pin 48 when it is engaged with a clamp bar.

The sixth clamp arm 40 has a first end 40A and a second end 40B transversely opposed thereto. The first end 40A and the second end 40B are at an angle to one another and are not within the same vertical plane. The angle changes at a critical point 40C of the sixth clamp arm 40. In an exemplary embodiment, the angle between the first end 40A and the second end 40B is greater than 90 degrees and less than 150 degrees. In a further embodiment the angle greater than 90 degrees and less than 135 degrees. In yet another further embodiment the angle is greater than 90 degrees and less than 120 degrees.

Proximate the first end 40A of the sixth clamp arm 40, there is a first aperture 40D. The first aperture 40D is circular in shape and is of a diameter equal to or slightly greater than the first end 46A of the pivot bushing 46. Further, there is a second aperture 40E proximate the second end 40B of the sixth clamp arm 40. The second aperture 40E is circular in shape and is of a diameter equal to or slightly greater than the through holes 12G, 14G of the clamp arms 12, 14. The removable lock pin 49 is operative to nest in the second aperture 40E at a first end 49A. The removable lock pin 49 has a body and has the first end 49A and a second end 49B longitudinally opposed from the first end 49A. The body of the removable lock pin 49 is generally cylindrical in nature with an aperture 49C with a graspable projection 49D proximate the first end 49A. At the second end 49B there is a tapered portion 49E. Proximate the tapered portion 49E is a bearing 49F. The bearing 49F is operative to restrict movement of the pin 49 while inserted and no force is applied to the pin about its graspable projection 49D. Further, there is a retaining portion 49G operative to restrict movement the clamp arms of the lock pin 49 when it is engaged with a clamp bar. The first end 49A of the removable lock pin 49 is operative to nest in the second aperture 49E.

The seventh clamp arm 42 has a first end 42A and a second end 42B transversely opposed thereto. The first end 42A and the second end 42B are at an angle to one another and are not within the same vertical plane. The angle changes at a critical point 42C of the seventh clamp arm 42.

In an exemplary embodiment, the angle between the first end 42A and the second end 42B is greater than 90 degrees and less than 150 degrees. In a further embodiment the angle greater than 90 degrees and less than 135 degrees. In yet another further embodiment the angle is greater than 90 degrees and less than 120 degrees.

Proximate the first end 42A of the seventh clamp arm 42, there is a first aperture 42D. The first aperture 42D is circular in shape and is of a diameter equal to or slightly greater than the second end 46B of the pivot bushing 46. Further, there is a second aperture 42E proximate the second end 42B of the seventh clamp arm 42. The second aperture 42E is circular in shape and is of a diameter equal to or slightly greater than the through holes 12G, 14G of the clamp arms 12, 14. The second end 49A of the removable lock pin 49 is operative to nest in the second aperture 42E.

The eighth clamp arm 44 has a first end 44A and a second end 44B transversely opposed thereto. The first end 44A and the second end 44B are at an angle to one another and are not within the same vertical plane. The angle changes at a critical point 44C of the fourth arm 44. In an exemplary embodiment, the angle between the first end 44A and the second end 44B is greater than 90 degrees and less than 150 degrees. In a further embodiment the angle greater than 90 degrees and less than 135 degrees. In yet another further embodiment the angle is greater than 90 degrees and less than 120 degrees.

Proximate the first end 44A of the eighth clamp arm 44, there is a first aperture 44D. The first aperture 44D is circular in shape and is of a diameter equal to or slightly greater than the second end 46B of the pivot bushing 46. Further, there is a second aperture 44E proximate the second end 44B of the eighth clamp arm 44. The second aperture 44E is circular in shape and is of a diameter equal to or slightly greater than the through holes 12G, 14G of the clamp arms 12, 14. The second end 48A of the removable lock pin 48 is operative to nest in the second aperture 44E.

The first end 38A of the fifth clamp arm 38 is aligned by its aperture 38D with the first end 46A of the pivot bushing 46 and the first end 46A is placed through the aperture 38D. The first end 48A of the removable lock pin 48 is placed within the aperture 14G of the second clamp bar 14. The second end 38B of the fifth clamp arm 38 is aligned by its aperture 38E with the first end 48A of the removable lock pin 48 and the first end 48A is placed into the aperture 38E. The bearing 48F of the removable lock pin 48 is pushed through the aperture 38E and through the aperture 14G of the second clamp bar 14, thereby restricting movement and holding in operative contact the second clamp bar 14 with the second end 38B of the fifth clamp arm 38.

The first end 40A of the sixth clamp arm 40 is aligned by its aperture 40D with the first end 46A of the pivot bushing 46 and the first end 46A is placed through the aperture 40D. The locking washer 46E is then attached to the channel 46C of the pivot bushing 46 thereby restricting movement and holding in operative contact the first end 38A of the fifth clamp arm 38 and the first end 40A of the sixth clamp arm 40 in operative connection with the pivot bushing 46. The first end 48A of the removable lock pin 48 is placed within the aperture 12G of the first clamp bar 12. The second end 40B of the sixth clamp arm 40 is aligned by its aperture 40E with the first end 48A of the removable lock pin 48 and the first end 48A is placed into the aperture 40E. The bearing 48F of the removable lock pin 48 is pushed through the aperture 40E and through the aperture 12G of the first clamp bar 14, thereby restricting movement and holding in operative contact the first clamp bar 12 with the second end 40B of the sixth clamp arm 40.

The first end 42A of the seventh clamp arm 42 is aligned by its aperture 42D with the first end 46A of the pivot bushing 46 and the first end 46A is placed through the aperture 42D. The removable lock pin 49 having already been placed within the aperture 14G of the second clamp bar 14 is aligned with the second end 42B of the seventh clamp arm 42 by its aperture 42E. The second end 49B of the removable lock pin 49 is placed into the aperture 42E. The bearing 49F of the removable lock pin 49, having been previously inserted into the aperture 14G of the second clamp bar 14 is pushed through the aperture 42E and thereby restricts movement and holds the second end 42B of the seventh clamp arm 42 in operative contact with the second clamp bar 14.

The first end 44A of the eighth clamp arm 44 is aligned by its aperture 44D with the second end 46B of the pivot bushing 46 and the first end 46B is placed through the aperture 44D. The locking washer 46E is then attached to the channel 46D of the pivot bushing 46 thereby restricting movement and holding in operative contact the first end 42A of the seventh clamp arm 42 and the first end 44A of the eighth clamp arm 44 in operative connection with the pivot bushing 46. The removable lock pin 48 having already been placed within the aperture 12G of the first clamp bar 12 is aligned with the second end 44B of the eighth clamp arm 44 by its aperture 44E. The second end 44B of the eighth clamp arm 44 is aligned by its aperture 44E with the second end 48B of the removable lock pin 48 and the second end 48B is placed into the aperture 44E. The bearing 48F of the removable lock pin 48, having been previously inserted into the aperture 12G of the first clamp bar 12 is pushed through the aperture 44E and thereby restricts movement and holds the second end 44B of the eighth clamp arm 44 in operative contact with the first clamp bar 12.

The pivot bushing 46 further includes a point 46F that is located on a central portion of the body of the pivot bushing 48. In one embodiment, the hole 46 and contains a post 50 within it. The post 50 may be a solid metal rod or other such similarly disposed piece. The post 50 has a generally cylindrical body with a first end 50A, and a second end 50B that is transversely opposed thereto. At the first end 50A, the post 50 is operatively engaged with the pivot bushing 46 at a point 46F. The post may be fixedly attached or may be threaded or otherwise operatively engaged. At the second end 50B there is a clamping foot 52. The clamping foot 52 is operatively engaged with the second end 50B. The clamping foot has a body that is generally "H" shaped with a first face 52A and a second face 52B that is transversely opposed thereto. Further is a top side 52C, a bottom side 52D vertically disposed from the top side 52C. Additionally, there is a first side post 52E, a second side face 52F and a midsection 52G that come to form the "H" shape. Further, there is a cavity 52H on top proximate the arm 12 and a cavity 52J proximate the arm 14. In an exemplary embodiment, both of the clamping feet 34, 52 may further be removed and replaced with different sized clamping feet that may be longer or shorter in length. The determination of proper clamping feet distance will be made by a user on a case to case basis depending on the desired work material. Further, there is a width W6 that is the distance of the cavity 54H and a distance W7 which is the total width of the installed clamp arms 40, 42, 44, 46. The width W6 is slightly larger than the width of W7 to allow for a minuscule amount of play and ease of alignment. In one embodiment the width W6 is substantially identical to W4 while the width W5 is substantially identical to W7.

Having thus described an exemplary non-limiting configuration of the system 10, its operation will be discussed with reference to some exemplary features used with the various embodiments. When using a traditional clamping technique using parallel jaw clamps, it would require two clamps across your work piece to provide horizontal pressure plus two additional clamps and clamping cauls providing vertical pressure. As a result, a user would need to adjust four screws on the parallel jaw clamps. While using the system as seen and described would require just one adjustment.

Figure 9:
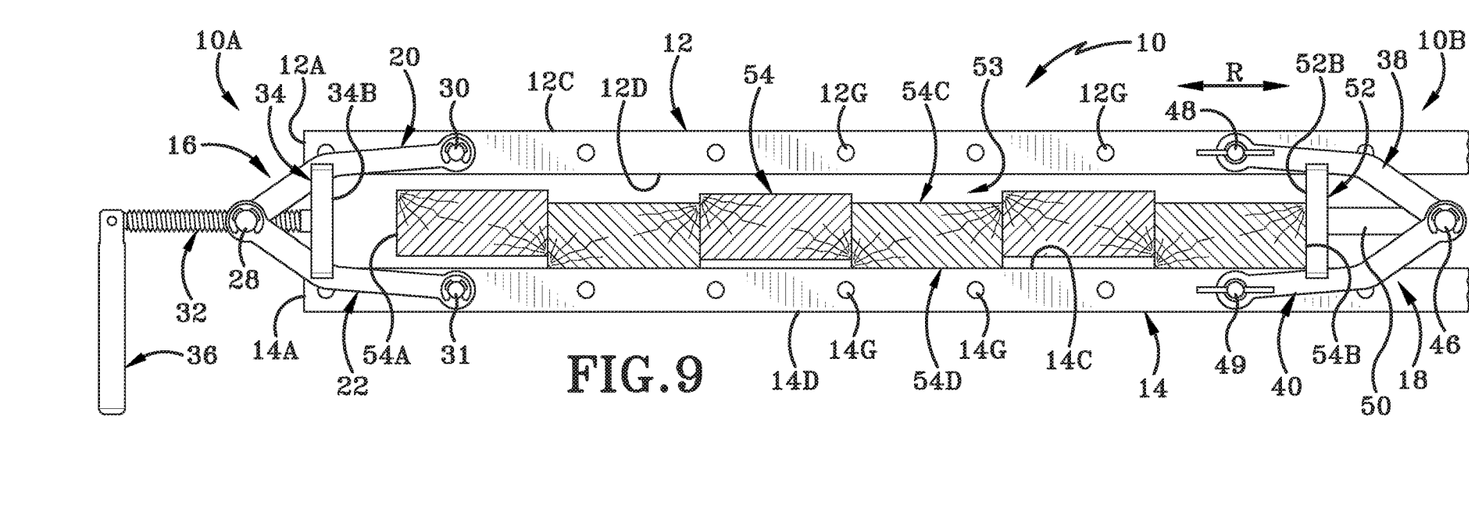
FIG. 9 is a front elevation operational view of the exemplary clamp system during alignment.
Figure 10:
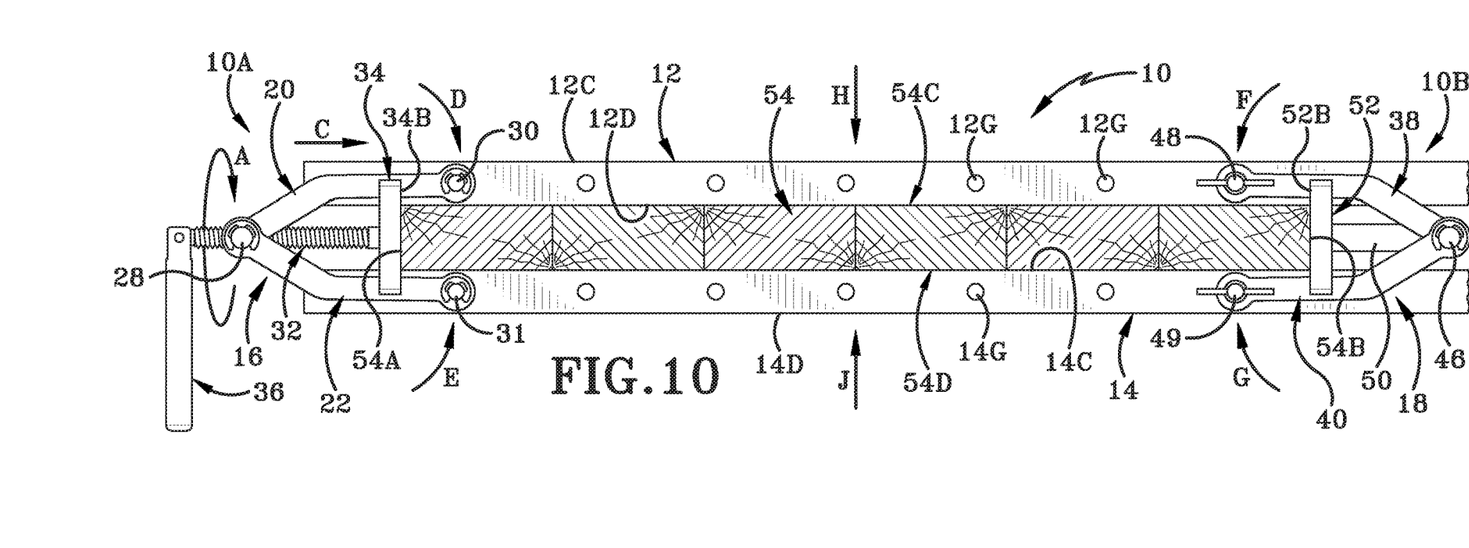
FIG. 10 is a front elevation operational view of the exemplary clamp system engaged with a set of boards.

Referring to FIG. 9 and FIG. 10, operation of the system 10 is shown. A user would load wood or other material 54 desired to be put into contact with one another into a cavity or otherwise area for material 53. The first clamp bar 12 or second clamp bar 14 may be placed onto a surface. The loading may then occur by first removing both of the removable lock pins 48 by applying force to their graspable portions 48D, forcing the bearing 48F to retreat into the body of the removable lock pins 48. As a result, the second clamp assembly 18 is removed and wood or other such material 54 may be loaded between the clamp bars 12, 14. The material 54 may have different heights when viewed from the side as is seen in FIG. 9. This may be due to various bows, warps or otherwise inconsistencies with the material 54. These bows, warps or otherwise inconsistencies can make working with various materials 54 significantly difficult.

After aligning all of the ends of the material 54, the clamp bar 12, 14 not on the surface, in the exemplary embodiment that is the first clamp bar 12, may be lowered onto the top of the material 54. Then, the second clamp assembly 18 may be reattached based on the position of the material 54. The second clamp assembly 18 may be adjusted as needed as indicated by arrow "R". In order to reattach the assembly a user may place the lock pins 48 into the aperture 38E of the fifth clamp arm 38 proximate its second end 38B which would depress the bearing 48F into the second clamp bar aperture 14G, thereby fixedly engaging the fifth clamp bar 38 with the clamp bar 14. Continue pushing, the removable lock pin 48 through the first side 14E of the second clamp bar 14, until the bearing 48F makes contact with the apertures 14G on the second side 14F, and depresses the bearing 48F and allow it to pass through the aperture 14G. The aperture 42E of the seventh clamp arm 42 may be already aligned with the aperture 14G on the second side 14F or may be brought into contact after pressing the removable lock pin through the aperture 14G. This contact secures in fixed engagement the seventh clamp arm 42 to the second clamp bar 14.

Then, another of the lock pins 48 would be placed into the aperture 40E of the sixth clamp arm 40 proximate its second end 40B which would depress the bearing 48F into the first clamp bar aperture 12G, thereby fixedly engaging the sixth clamp arm 40 with the first clamp bar 12. Continue pushing, the removable lock pin 48 through the first side 12E of the first clamp bar 12, until the bearing 48F makes contact with the aperture 12G on the second side 12F, and depresses the bearing 48F and allow it to pass through the aperture 12G. The aperture 44E of the eighth clamp arm 44 may be already aligned with the aperture 12G on the second side 12F or may be brought into contact after pressing the removable lock pin through the aperture 12G. This contact secures in fixed engagement the eighth clamp arm 44 to the first clamp bar 12.

Most clamps introduce a bow in the material 54 as they are clamping from one side, whichever side has the bar. However, the exemplary system 10 allows for force to be applied from four distinct directions to allow constant pressure. Referring specifically to FIG. 10, the handle 36 is rotated in a first direction "A". This rotation in the first direction "A" turns the threaded member 32 through the bore 28F of the pivot bushing 28 and pushes the second face 34B of the clamping foot 34 into contact with the material 54 indicated by arrow "C" while the other clamping foot 52 exerts force back in the opposite direction. Simultaneous to this occurring, the clamp arms, 20, 22, 24, 26, 38, 40, 42, 44 adjust their locations based on the thickness of the material 54 to be clamped. This location adjustment is shown by arrows "D", "E", "F", and "G". The adjustment of the clamp arms, 20, 22, 24, 26, 38, 40, 42, 44 allows for accommodation of the material 54 within them and are free to rotate about their connections to the bars 12, 14. As such, in a further embodiment, the arrows "D", "E", "F", and "G" may point in an opposite direction when the material 54 is thicker to accommodate for the thickness, while then clamping down in their current direction to apply the force to the material 54.

One embodiment provides a method for applying force to a work material 54 comprising: loading work material 54 between a first clamp bar 12 with a bottom surface 12D and a second clamp bar 14 with a top surface 14C, abutting the work material 54 with a first clamping foot 34 on a first clamp assembly 16. A first horizontal force is then applied with the clamping foot 34 to a first side 54A of the work material 54. This, in turn allows a second side 54B of the work material 54 to contact the second clamping foot 52 on the second clamp assembly 18 and a second horizontal force is applied to the second side 54B of the work material 54. The first clamp bar 12 may then hold the material 54 flat by applying a first vertical force with the bottom surface 12D of the first clamp bar 12 on a top surface 54C of the work material 54 working in conjunction with the top surface 14C of the second clamp bar 14 applying a second vertical force to a bottom surface 54D of the work material 54. These forces may result in the movement of the clamp arms as discussed above in response to the thickness of the material. Alternatively, the second clamp assembly 18 may be abutted to the material 54 first, in which case, the horizontal forces would still exist, but the first and second would be reversed.

The system allows for a range of material 54 to be from ⅝" to 2". For material thinner than ⅝", a piece of ¾" scrap above and below the material would be sufficient to allow for clamping. If the material is thicker than 2", a 2×2 piece of further material to the edges in order to contact the clamping feet 34, 52 while still maintaining contact with the clamp bars 12, 14. The clamp bar 12 is operative to exert a force "H" by the bottom 12D impacting the material 54. While the clamp bar 14 is operative to exert a force "J" by the top 12C impacting the material 54. These forces exert over 6500 pounds of clamping pressure on the material 54, keeping the piece very still with even force for a perfect clamp.

Frequently, prior to clamping the material 54 together, glue, adhesive, joints, or other such connecting devices and methods may be used to connect various pieces together. As such, this system 10 would be used to directly abut various pieces of material 54 together and apply the pressure while the glue, adhesive or other connections are drying or setting up.

After the desired time for clamping is over, the handle 36 may be rotated in a second direction, thereby retracting the threaded member 32. This allows the clamping foot 34 to no longer make contact with the material 54. At this point, the removable lock pins 48 may be safely removed by grasping the graspable portion 48D, and pulling them from the second sides 12F, 14F of the clamp bars 12, 14 to the first sides 12E, 14E. The clamp system 10 may then be reloaded in a similar manner to begin clamping an additional material.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0. % of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, any method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clarity, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A system for clamping material, said system comprising:
   a first clamp bar extending in a transverse manner,
   a second clamp bar parallel to the first clamp bar extending in a transverse manner;
   a first clamp assembly operatively coupled to the first clamp bar and the second clamp bar;
   a second clamp assembly operatively coupled to the first clamp bar and the second clamp bar; wherein each the first clamp bar and second clamp bar have a plurality of clamp arms; wherein each of the plurality of clamp arms have a critical point that defines an angle between a first end and a second end of the clamp arm, wherein the angle is angled towards the material when in a clamping position, and wherein the system is operative to apply force to four sides of a material desired to be clamped.

2. The system of claim 1, wherein the plurality of clamp arms are angled at an angle greater than 90 degrees and less than 180 degrees.

3. The system of claim 2, wherein the plurality of clamp arms are angled at an angle greater than 120 degrees and less than 160 degrees.

4. The system of claim 1, wherein the first clamp assembly comprises:
   an upper clamp;
   a lower clamp; and
   a clamping foot operatively connected to the upper clamp and lower clamp.

5. The system of claim 4, further comprising:
   a threaded member in operative connection with the clamping foot and pivot bushing, wherein the pivot bushing has an aperture in which the threaded member is threaded within.

6. The system of claim 5, further comprising:
   a handle operatively connected to the threaded member at a first end and the clamping foot at the second end, wherein rotation of the handle in a first direction is operative to move the threaded member and thereby the clamping foot in a direction towards the material.

7. The system of claim 4, wherein the clamping foot is of an H-shape.

8. The system of claim 1, wherein the second clamp assembly is operative to be disengaged from the first and second clamp bars.

9. The system of claim 4, wherein the first clamp bar and second clamp bar contain a plurality of apertures.

10. The system of claim 9, wherein the plurality of clamp arms includes eight clamp arms; wherein the first clamp assembly is attached by a first engagement placed through an aperture in a first and third clamp arms to the first clamp bar and a second engagement placed through an aperture in a second and fourth clamp arms to the second rail bar.

11. The system of claim 10, wherein the second clamp assembly comprises:
an upper clamp;
a lower clamp; and
a clamping foot operatively connected to the upper clamp and lower clamp.

12. The system of claim 11, wherein the second clamp assembly is attached by a first removable engagement placed through an aperture in a fifth and seventh clamp arms to the first clamp bar and a second removable engagement placed through an aperture in a sixth and eighth clamp arms to the second rail bar.

13. The system of claim 1, wherein the first clamp bar and second clamp bar may be interchanged with a third clamp bar and a fourth clamp bar that are of different length than the first clamp bar and second clamp bar.

14. A method for clamping work material comprising:
loading work material between a first clamp bar with a bottom surface and a second clamp bar with a top surface;
contacting the work material with the bottom of the first clamp bar and the top surface of the second clamp bar;
abutting the work material with a clamping foot on a first clamp assembly;
further abutting the work material with a clamping foot on a second clamp assembly;
accommodating the work material between a first clamp arm and a second clamp arm wherein each of the plurality of clamp arms have a critical point that defines an angle between a first end and a second end of the respective clamp arm, wherein the angle is angled towards the material when in a clamping position; and
applying force to four sides of the work material by the bottom surface of the first clamp bar, top surface of the second clamp bar, the clamping foot on the first clamp assembly and the clamping foot on the second clamp assembly.

15. The method of claim 14, wherein further abutting further comprises:
attaching the second clamp assembly to first and second clamp bar.

16. The method of claim 14, wherein prior to loading: removing the second clamp assembly.

17. The method of claim 14, wherein the abutting further comprises:
rotating a handle in engagement with the clamping foot to bring the clamping foot in engagement with the material.

18. The method of claim 14, wherein further abutting further comprises:
attaching the second clamp assembly at an aperture of the first clamp bar via a removable pin; and
further attaching the second clamp assembly at an aperture of the second clamp bar via a removable pin.

19. The method of claim 14, wherein loading further comprises:
placing a piece of further material above or below the work material to abut at least one of the first clamp bar or second clamp bar if the material has a thickness of less than $3/8$ of an inch.

20. The method of claim 14, wherein loading further comprises:
placing a piece of further material to a side of the work material to abut at least one of the clamping foot on the first clamp assembly or second clamp assembly.

21. A method for applying force to a work material comprising:
loading work material between a first clamp bar with a bottom surface and a second clamp bar with a top surface;
abutting the work material with a first clamping foot on a first clamp assembly;
accommodating the work material by moving at least one clamp arm on the first clamp assembly wherein at least one clamp arm has a critical point that defines an angle between a first end and a second end of the respective clamp arm, wherein the angle is angled towards the material when in a clamping position;
applying a first horizontal force with the clamping foot to a first side of the work material;
contacting a second side of the work material with a second clamping foot on a second clamp assembly;
accommodating the work material by moving at least one clamp arm on the second clamp assembly;
applying a second horizontal force with the clamping foot to a second side of the work material;
applying a first vertical force with the bottom surface of the first clamp bar on a top surface of the work material; and
applying a second vertical force with the top surface of the second clamp bar on a bottom surface of the work material.

22. The method of claim 21, simultaneously to applying the first horizontal force further comprising:
moving the clamp arms on the first clamp assembly in response to a thickness of the material.

* * * * *